United States Patent
Barciet

(10) Patent No.: US 11,067,120 B2
(45) Date of Patent: Jul. 20, 2021

(54) ROLLING BEARING, NOTABLY LARGE-DIAMETER ROLLING BEARING

(71) Applicant: Aktiebolaget SKF, Gothenburg (SE)

(72) Inventor: Damien Barciet, Lucy-le-Bois (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/791,022

(22) Filed: Feb. 14, 2020

(65) Prior Publication Data

US 2020/0340524 A1 Oct. 29, 2020

(30) Foreign Application Priority Data

Apr. 26, 2019 (DE) .......................... 102019206039.0

(51) Int. Cl.
| | | |
|---|---|---|
| *F16C 19/54* | (2006.01) | |
| *F16C 33/60* | (2006.01) | |
| *F16C 19/36* | (2006.01) | |
| *F16C 33/58* | (2006.01) | |
| *F16C 19/38* | (2006.01) | |

(52) U.S. Cl.
CPC .......... *F16C 19/361* (2013.01); *F16C 19/545* (2013.01); *F16C 33/60* (2013.01); *F16C 19/381* (2013.01); *F16C 33/585* (2013.01); *F16C 2300/14* (2013.01)

(58) Field of Classification Search
CPC .... F16C 19/361; F16C 19/381; F16C 19/545; F16C 33/60; F16C 2300/14; F16C 2350/26; F16C 2360/31
See application file for complete search history.

(56) References Cited

U.S. PATENT DOCUMENTS

| | | | | |
|---|---|---|---|---|
| 9,605,709 | B2 * | 3/2017 | Kaesler ................. | F16C 19/505 |
| 2003/0012469 | A1 * | 1/2003 | Dittenhofer ............ | F16C 33/51 |
| | | | | 384/455 |
| 2010/0044331 | A1 * | 2/2010 | Roodenburg ......... | F16C 19/505 |
| | | | | 212/253 |

FOREIGN PATENT DOCUMENTS

| | | | | |
|---|---|---|---|---|
| EP | 1239172 A2 * | 9/2002 | ............ | F16C 19/505 |
| EP | 2092204 B1 | 8/2012 | | |
| EP | 2307745 B1 | 5/2013 | | |

\* cited by examiner

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

A rolling bearing provides an inner ring and an outer ring concentrically about a rotation axis X-X' running in an axial direction, and at least first and second axial bearings each axially disposed between the inner ring and the outer ring and each having at least one row of rolling elements, the first and second axial bearings being spaced apart from each other in the axial direction. The rolling bearing further provides only one radial bearing radially disposed between the inner ring and the outer ring and having at least one row of rolling elements. The radial bearing is disposed between an outer raceway located on the inner ring and an inner raceway located on the outer ring.

20 Claims, 2 Drawing Sheets

ROLLING BEARING, NOTABLY LARGE-DIAMETER ROLLING BEARING

CROSS-REFERENCE TO RELATED APPLICATIONS

This application claims priority to German Patent Application no. 102019206039.0, filed Apr. 26, 2019, the contents of which are fully incorporated herein by reference.

FIELD OF THE INVENTION

The present invention relates to the field of rolling bearings for absorbing axial and radial forces and having an inner ring and an outer ring arranged concentrically about an axis of rotation running in an axial direction.

The invention relates more particularly to the field of large-diameter rolling bearings, notably those used in a tunnel boring machine, or in the field of defence such as radars, chars, or excavator applications. Large-diameter rolling bearings may also be used for the mounting of rotor blades on wind turbines.

BACKGROUND OF THE INVENTION

A large-diameter rolling bearing comprises generally two concentric inner and outer rings, and a bearing assembly comprising two rows of axial rollers and one row of radial rollers. Such rolling bearings are generally loaded, both axially and radially, often with a relatively strong load.

Depending on the use of roller bearing, considerable forces may arise, which may cause deformation of the bearing, notably of the rotating ring, leading in some cases, to locally separate the rings. As a matter of fact, a radial gap between rotating ring and fixed ring of the roller bearing can be created.

In order to overcome this drawback, the rolling bearing disclosed in patent EP2307745 B1 comprises a radial bearing radially disposed between the inner and outer rings, and an axial roller bearing and a combined radial-axial roller bearing that are axially disposed between the rings.

However, such rolling bearing is not able to bear high axial load and high tilting moment.

Reference can also be made to the roller bearing disclosed in patent EP2092204 B1 which was developed to realize a more uniform force distribution and counteract the deformation of the rings. This rolling bearing comprises two opposite radial bearings and two opposite axial bearings disposed in such a way to surround a nose ring of the outer ring.

However, radial dimension of such rolling bearing requires a considerable installation space. Otherwise, the mounting of the four bearings also requires a large number of assembly steps.

One aim of the present invention is to overcome these drawbacks.

SUMMARY OF THE INVENTION

It is a particular object of the present invention to provide a rolling bearing capable of absorbing axial and radial loads as well as supporting radial deformation which may occur under high radial loads.

In one embodiment, the rolling bearing comprises an inner ring and an outer ring which are arranged concentrically about a rotation axis running in an axial direction, and at least first and second axial bearings each axially disposed between the inner ring and the outer ring, the first and second axial bearings being spaced apart from each other in the axial direction. The first and second axial bearings each have at least one row of rolling elements.

The rolling bearing further comprises only one radial bearing radially disposed between the inner ring and the outer ring, and having at least one row of rolling elements.

According to a general feature of the invention, the radial bearing is disposed between an outer raceway located on the inner ring and an inner raceway located on the outer ring.

The terms "axial bearings" is understood to mean bearings adapted to accommodate axial loads whereas the terms "radial bearing" is understood to mean bearing adapted to accommodate radial loads.

With such an arrangement of the radial bearing, radial deformation of the rolling bearing and gap opening between inner ring and outer ring in radial direction are limited.

Besides, with the two axial bearings, the rolling bearing is able to bear high axial load and high tilting moment.

Otherwise, with regard to a rolling bearing comprising two radial bearings radially disposed between the inner and outer rings, the number of parts used to form the rings is limited with the new design of the rolling bearing. The installation space required is reduced and the design of the rolling bearing is compact.

The radial bearing may be radially offset with respect to the first and second axial bearings. Preferably, the radial bearing is axially located between the first and second axial bearings. Accordingly, the radial bearing does not project in the axial direction beyond the first and second axial bearings. Thanks to this arrangement, in the axial direction, there is no additional space requirement for the arrangement of the radial bearing.

In one embodiment, one of the inner and outer rings comprises an annular groove opening in a radial direction towards the other ring and into which a protruding nose of the other ring is located.

The first and second axial bearings can be disposed axially on each side of the protruding nose of the other ring. The first and second axial bearings can be each axially disposed between the protruding nose of the other ring and the groove of the ring.

In a particular embodiment, the protruding nose of the other ring and the ring each have a projection that respectively engage behind one another in the radial direction, the outer and inner raceways for the radial bearing being located on the projections. In particular, at least the projection of the other ring may have an L-shape with a radial portion and an axial portion. The axial portion may extend a free end of the radial portion.

In one embodiment, the ring comprising the groove is divided in the axial direction in at least a support part and a holding part secured together, the outer or inner raceway for the radial bearing being located on the support part. The first axial bearing may be axially disposed between the support part and the other ring. The second axial bearing may be axially disposed between the holding part and the other ring. The support part and the holding part of the ring may delimit together the annular groove.

The ring of the rolling bearing may be the inner ring and the other ring may be the outer ring. Alternatively, the ring may be the outer ring and the other ring may be the inner ring.

The first and second axial bearings and the radial bearing each comprise at least one row of rolling elements, for example cylindrical rollers. Alternatively, the use of other type of rolling elements, for example balls, can also be considered. Preferably, the first and second axial bearings and the radial bearing each comprise only one row of rolling elements. Alternatively, at least one of the first and second axial bearings and the radial bearing may comprise at least two rows of rolling elements.

In one embodiment, the rolling bearing comprises only the first and second axial bearings axially disposed between the inner ring and the outer ring.

The rolling elements of the axial and radial bearings can be arranged in cages for example made of plastic, steel, etc. The cage may be segmented or made in one part. Alternatively, the rolling bearing may comprise a plurality of spacers disposed circumferentially between the rolling elements.

The raceways located on the inner and outer rings for the axial and radial bearings may be formed directly on the rings. The raceways may be hardened.

Alternatively, the raceways located on the inner and outer rings may be formed by separated parts secured to the rings.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
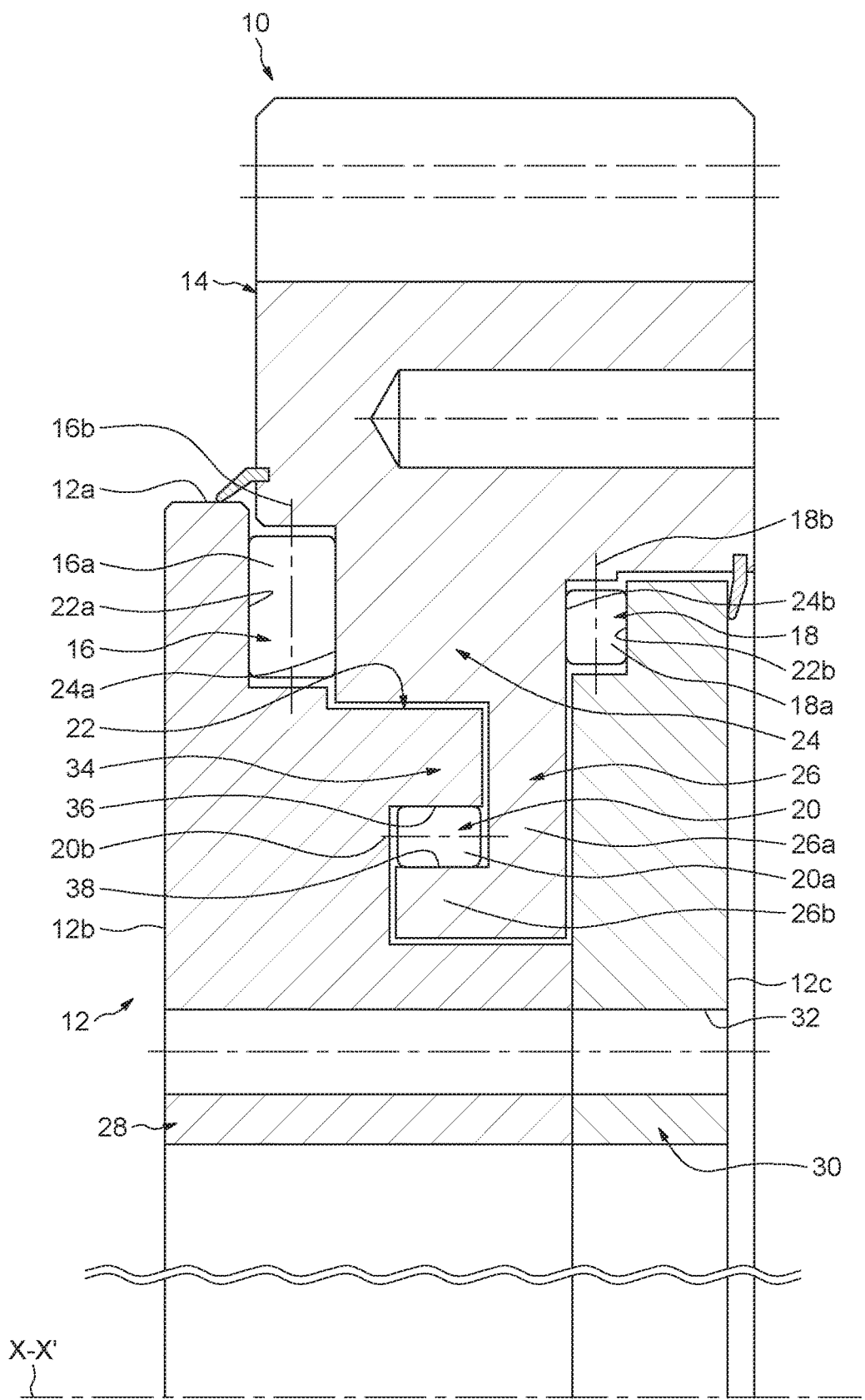
FIG. 1 is a partial cross-section of a rolling bearing according to a first example of the invention.

The rolling bearing 10 as illustrated on FIG. 1 is a large-diameter rolling bearing comprising a first ring 12 and an second ring 14. In the illustrated example, the first ring 12 is the inner ring of the rolling bearing whereas the second ring 14 is the outer ring. The rolling bearing 10 may for example be used in a tunnel boring machine, a wind turbine or any other applications using a large diameter rolling bearing.

The inner and outer rings 12, 14 are concentric and extend axially along the bearing rotation axis X-X' which runs in an axial direction.

The rolling bearing 10 also comprises first and second axial bearings 16, 18 arranged axially between the inner and outer rings 12, 14, and a radial bearing 20 arranged radially between the rings.

The inner ring 12 comprises an annular groove 22 opening in a radial direction outwardly towards the outer ring 14. The inner ring 12 comprises an outer cylindrical surface 12a from which the groove 22 is formed. The inner ring 12 further comprises two opposite radial frontal surfaces 12b, 12c which axially delimit the outer surface 12a of the ring.

The outer ring 14 comprises an annular protruding lobe or nose 24 engaging into the annular groove 22 of the inner ring. The nose 24 extends radially inwards.

The first and second axial bearings 16, 18 are arranged axially between the nose 24 of the outer ring and the groove 22 of the inner ring. The radial bearing 20 is arranged axially between the nose 24 of the outer ring and the groove 22 of the inner ring.

The first and second axial bearings 16, 18 are spaced apart from each other in the axial direction. The first and second axial bearings 16, 18 are disposed on each side of the nose 24 of the outer ring. The rotation axes of the axial bearings 16, 18 are parallel one relative to another and perpendicular to the rotation axis X-X' of the roller bearing 10.

In the illustrated example, the axial bearing 16, 18 comprises a row of axial cylindrical rollers 16a, 18a having a rotation axis 16b, 18b perpendicular to the rotation axis X-X' of the roller bearing 10. The axial rollers 16a, 18a roll on raceways located on the groove 22 of the inner ring and on the nose 24 of the outer ring.

A first flank 22a of the groove and a first flank 24a of the nose 24 axially facing the first flank 22a delimit the raceways for the axial rollers 16a. A second flank 22b of the groove and a second flank 24b of the nose axially facing the second flank 22b delimit the raceways for the axial rollers 18a. The opposite first and second flanks 22a, 22b delimit axially the groove 22 of the inner. Similarly, the opposite first and second flanks 24a, 24b here delimit axially the nose 24 of the outer ring. The first and second axial bearings 16, 18 come into contact with the opposite flanks 24a, 24b of the protruding nose 24.

In the illustrated example, the axial length of the rollers 16a of the first axial bearing is larger than the one of the rollers 18a of the second axial bearing. Alternatively, the axial length of the rollers 16a may be smaller than, or may be equal to, the one of the rollers 18a.

The nose 24 of the outer ring is provided with an annular projection 26 extending inwards. The projection 26 has an L-shape. The projection 26 comprises a radial portion 26a extending radially inward from the nose 24, and a free axial portion 26b extending a small-diameter edge of the radial portion.

In the illustrated example, the outer ring 14 is made in one part. Alternatively, the outer ring 14 may be divided in the axial direction in at least two separate parts secured together. In another variant, the nose 24 may be made separately from the main part of the outer ring. In the illustrated example, a toothing is provided on the outer ring 14.

The inner ring 12 is divided in the axial direction in two separate parts, a support part 28 and a holding part 30 which are secured together. The support part 28 and the holding part 30 axially bear one against the other. In the illustrated example, passage holes 32 are provided on the support and holding parts 28, 30 which permit the fastening of these two part by bolts.

The support part 28 and the holding part 30 of the inner ring delimit together the groove 22. The first flank 22a, which delimits on the inner ring 12 the raceway for the axial bearing 16, is located on the support part 28. The second flank 22a delimiting on the inner ring 12 the raceway for the axial bearing 18 is located on the holding part 30.

The support part 28 of the inner ring comprises an annular axial projection 34 extending axially towards the holding part 30 while remaining axially distant. The projection 34 axially faces the radial portion 26a of the projection 26 of the outer ring. The projection 34 radially surrounds the axial portion 26b of the projection 26. The projection 34 and the axial portion 26b of the projection 26 are engaged behind one another and spaced in the radial direction. The radial portion 26a of the projection 26 is axially disposed between the support part 28 and the holding part 30.

Between the projection 34 of the inner ring and the projection 26 of the nose 24 of the outer ring, there is arranged the radial bearing 20. More precisely, the radial bearing 20 is arranged radially between the projection 34 and the axial portion 26b of the projection 26.

The projection 34 of the inner ring delimits an outer raceway 36 for the radial bearing 20. The axial portion 26b of the projection 26 of the outer ring delimits an inner raceway 38 for the radial bearing. The bore of the projection 34 delimits the outer raceway 36. The outer surface of the axial portion 26b of the projection delimits the inner raceway 38. The outer raceway 36 radially faces the inner raceway 38. The radial bearing 20 is radially disposed between the outer raceway 36 delimited on the inner ring 12 and the inner raceway 38 delimited on the outer ring 14.

The rotation axis of the radial bearing 20 is coaxial with the rotation axis X-X' of the roller bearing 10. In the illustrated example, the radial bearing 20 comprises a row of radial cylindrical rollers 20a having a rotation axis 20b parallel to the rotation axis X-X'. The radial rollers 20a roll on the outer and inner raceways 36, 38 located on the inner and outer rings.

The radial bearing 20 is radially offset inwards with respect to the first and second axial bearings 16, 18. The radial bearing 20 is axially located between the first and second axial bearings 16, 18.

Otherwise, as previously mentioned, in this illustrated example, the first ring of the rolling bearing is the inner ring 12 whereas the second ring is the outer ring 14.

Figure 2:
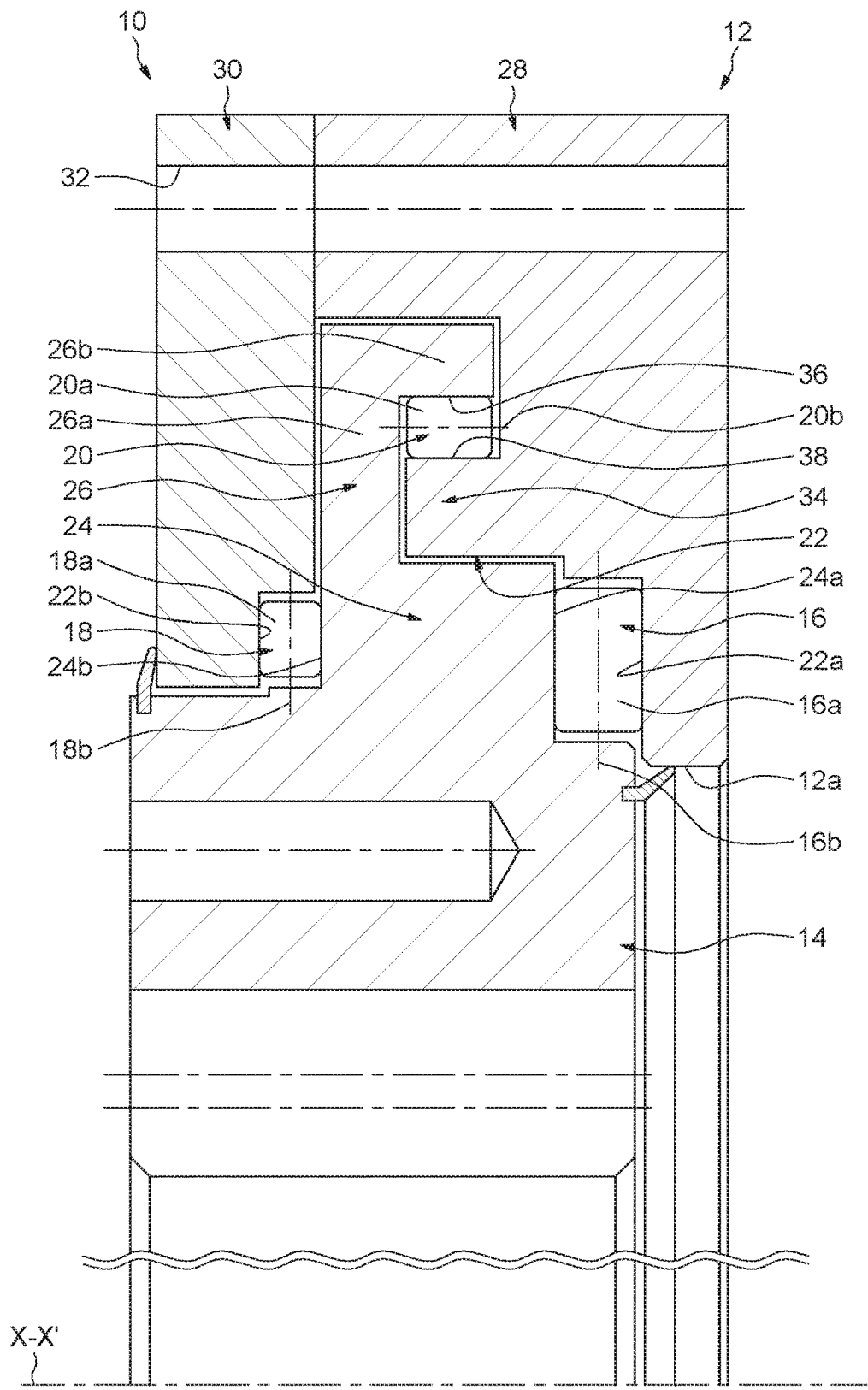
FIG. 2 is a partial cross-section of a rolling bearing according to a second example of the invention.

As an alternative, it could be possible to provide a reversed arrangement with the first ring forming the outer ring 12 and the second ring forming the inner ring 14 as shown on FIG. 2, in which identical parts are given identical references. In this second example, the groove 22 formed on the outer ring 12 opens radially inwards and the nose 24 of the inner ring extends radially outwards.

The axial portion 26b of the projection 26 of the inner ring delimits the outer raceway 36 for the radial bearing 20. The projection 34 of the outer ring delimits the inner raceway 38 for the radial bearing 20. More precisely, the bore of the axial portion 26b of the projection delimits the outer raceway 36. The outer surface of the projection 34 delimits the inner raceway 38. In this embodiment, the outer raceway 36 for the radial bearing is still located on the inner ring 12, and the inner raceway 38 for the radial bearing is located on the outer ring 14. The radial bearing 20 is radially offset outwards with respect to the first and second axial bearings 16, 18.

The invention claimed is:

1. A rolling bearing comprising:
    an inner ring and an outer ring arranged concentrically about a rotation axis running in an axial direction,
    at least first and second axial bearings each axially disposed between the inner and outer rings and each having at least one row of rolling elements, the first and second axial bearings being spaced apart from each other in the axial direction, and
    a single radial bearing radially disposed between the inner and outer rings and having at least one row of rolling elements, wherein
    the radial bearing is disposed between an outer raceway located on the inner ring and an inner raceway located on the outer ring, and
    wherein the radial bearing is axially located between the first and second axial bearings.

2. The rolling bearing according to claim 1, wherein the radial bearing is radially offset with respect to the first and second axial bearings.

3. The rolling bearing according to claim 1, wherein the inner ring comprises an annular groove opening in a radial direction towards the outer ring and into which a protruding nose of the outer ring is located.

4. The rolling bearing according to claim 3, wherein the protruding nose comprises a protruding nose projection and the inner ring comprises an inner ring projection, and
    wherein the protruding nose projection and the inner ring projection engage behind one another in the radial direction such that the outer raceway for the radial bearing is located on the inner ring projection and the inner raceway for the radial bearing is located on the protruding nose projection.

5. The rolling bearing according to claim 4, wherein at least the protruding nose projection has an L-shape with a radial portion and an axial portion.

6. The rolling bearing according to claim 1, wherein the first and second axial bearings and the radial bearing each comprise only one row of cylindrical rollers.

7. The rolling bearing according to claim 1, wherein the outer ring comprises an annular groove opening in a radial direction towards the inner ring and into which a protruding nose of the inner ring is located.

8. A rolling bearing comprising:
    an inner ring and an outer ring arranged concentrically about a rotation axis running in an axial direction,
    at least first and second axial bearings each axially disposed between the inner and outer rings and each having at least one row of rolling elements, the first and second axial bearings being spaced apart from each other in the axial direction, and
    a single radial bearing radially disposed between the inner and outer rings and having at least one row of rolling elements,
    wherein the radial bearing is disposed between an outer raceway located on the inner ring and an inner raceway located on the outer ring,
    wherein the inner ring comprises an annular groove opening in a radial direction towards the outer ring and into which a protruding nose of the outer ring is located, and
    wherein the first and second axial bearings are disposed axially on each side of the protruding nose of the outer ring.

9. The rolling bearing according to claim 8, wherein the radial bearing is radially offset with respect to the first and second axial bearings.

10. The rolling bearing according to claim 8, wherein the protruding nose comprises a protruding nose projection and the inner ring comprises an inner ring projection, and
    wherein the protruding nose projection and the inner ring projection engage behind one another in the radial direction such that the outer raceway for the radial bearing is located on the inner ring projection and the inner raceway for the radial bearing is located on the protruding nose projection.

11. The rolling bearing according to claim 10, wherein the protruding nose projection has an L-shape with a radial portion and an axial portion.

12. The rolling bearing according to claim 8, wherein the first and second axial bearings and the radial bearing each comprise only one row of cylindrical rollers.

13. A rolling bearing comprising:
    an inner ring and an outer ring arranged concentrically about a rotation axis running in an axial direction,
    at least first and second axial bearings each axially disposed between the inner and outer rings and each having at least one row of rolling elements, the first and second axial bearings being spaced apart from each other in the axial direction, and
    a single radial bearing radially disposed between the inner and outer rings and having at least one row of rolling elements, wherein the radial bearing is disposed between an outer raceway located on the inner ring and an inner raceway located on the outer ring, wherein the inner ring comprises an annular groove opening in a radial direction towards the outer ring and into which a protruding nose of the outer ring is located, and wherein the first and second axial bearings are each axially disposed between the protruding nose of the outer ring and the groove of the inner ring.

14. The rolling bearing according to claim 13, wherein the radial bearing is radially offset with respect to the first and second axial bearings.

15. The rolling bearing according to claim 13, wherein the protruding nose comprises a protruding nose projection and the inner ring comprises an inner ring projection, and wherein the protruding nose projection and the inner ring projection engage behind one another in the radial direction such that the outer raceway for the radial bearing is located on the inner ring projection and the inner raceway for the radial bearing is located on the protruding nose projection.

16. The rolling bearing according to claim 15, wherein the protruding nose projection has an L-shape with a radial portion and an axial portion.

17. A rolling bearing comprising:

an inner ring and an outer ring arranged concentrically about a rotation axis running in an axial direction, at least first and second axial bearings each axially disposed between the inner and outer rings and each having at least one row of rolling elements, the first and second axial bearings being spaced apart from each other in the axial direction, and a single radial bearing radially disposed between the inner and outer rings and having at least one row of rolling elements, wherein the radial bearing is disposed between an outer raceway located on the inner ring and an inner raceway located on the outer ring, wherein the inner ring comprises an annular groove opening in a radial direction towards the outer ring and into which a protruding nose of the outer ring is located, and wherein the inner ring is divided in the axial direction in at least a support part and a holding part secured together, the outer raceway for the radial bearing being located on the support part, and wherein the first axial bearing is axially disposed between the support part and the outer ring, the second axial bearing being axially disposed between the holding part and the outer ring.

18. The rolling bearing according to claim 17, wherein the radial bearing is radially offset with respect to the first and second axial bearings.

19. The rolling bearing according to claim 17, wherein the protruding nose comprises a protruding nose projection and the inner ring comprises an inner ring projection, and wherein the protruding nose projection and the inner ring projection engage behind one another in the radial direction such that the outer raceway for the radial bearing is located on the inner ring projection and the inner raceway for the radial bearing is located on the protruding nose projection.

20. The rolling bearing according to claim 19, wherein the protruding nose projection has an L-shape with a radial portion and an axial portion.

\* \* \* \* \*